UNITED STATES PATENT OFFICE.

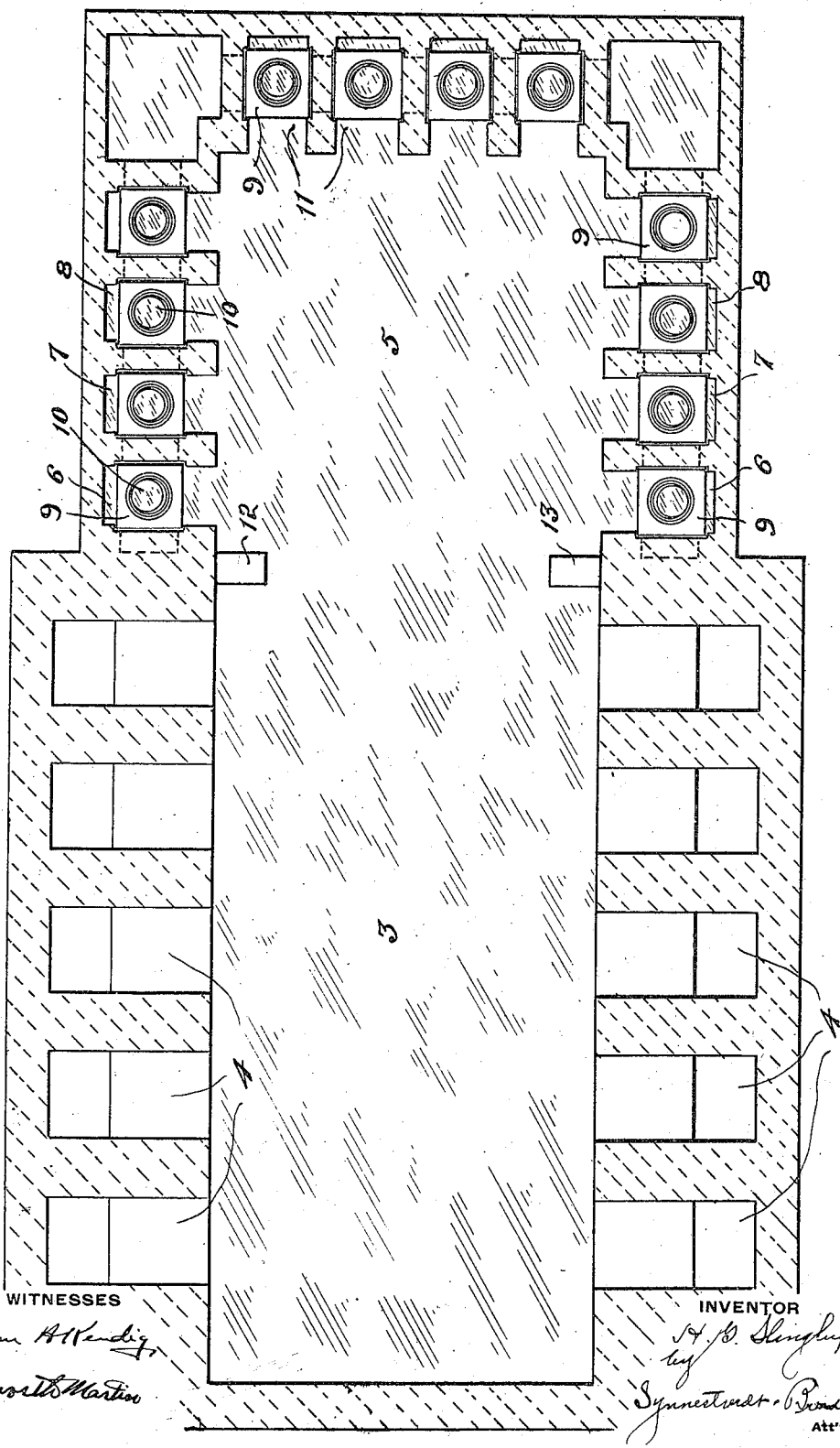

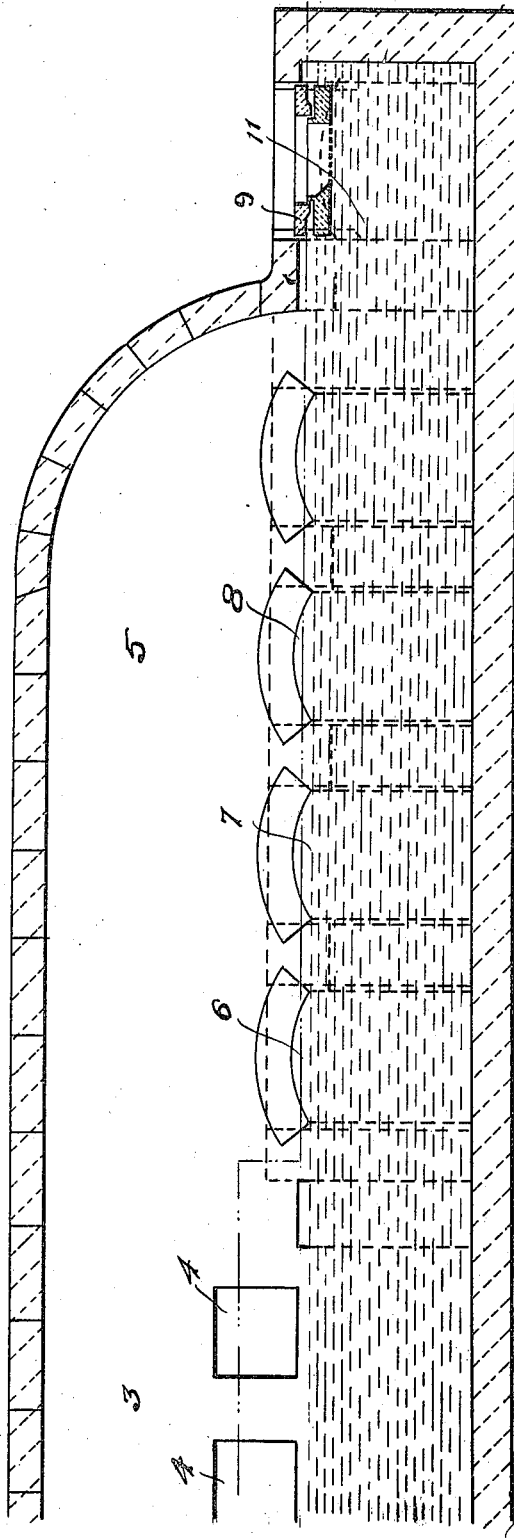

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-TANK.

1,251,931. Specification of Letters Patent. Patented Jan. 1, 1918.

Application filed January 20, 1914. Serial No. 813,197.

*To all whom it may concern:*

Be it known that I, HARRY G. SLINGLUFF, a citizen of the United States, residing at Mount Vernon, in the county of Knox and State of Ohio, have invented certain new and useful Improvements in Glass-Tanks, of which the following is a specification.

The invention relates to tanks for the manufacture of window glass in which the melting tank is in communication with a drawing tank or extension, or a series of such extensions. It has for its primary objects, the provision of an arrangement for securing greater uniformity of temperature in the drawing tanks, and the provision of an arrangement to prevent surface impurities from working into the drawing tanks, and particularly into those nearest the heated portion of the melting tank. One embodiment of the invention is illustrated in the accompanying drawings, wherein—

Figure 1 is a horizontal section taken through a tank constructed in accordance with my invention, and Fig. 2 is a partial longitudinal section taken through the same tank.

The left hand end 3 of the tank (Fig. 1) is heated from regenerators in the usual way, 4 indicating the plurality of passages on each side of the furnace, whereby gases are supplied over the glass in the tank, while 5 is the drawing end of the tank, which is not heated, but which is in free communication with the portion 3 as indicated in Figs. 1 and 2. Opening into the sides of the portion 5 of the melting tank are the extensions or drawing tanks 6, 7, 8, etc. These extensions or drawing tanks are in free communication with the melting tank, and in the particular embodiment of the invention illustrated, are provided with the movable covers or top stones 9, well known in the art, and provided with the drawing openings 10. Opening from the end of the portion 5 are other drawing tanks 11 also provided with top stones and similar in construction to the drawing tanks at the sides of the tank.

As the drawing progresses from the various drawing tanks, a large quantity of glass is of course withdrawn from the portion 5 of the melting tank, thus causing a flow of glass from the heating end 3. I have found that the impurities floating upon the surface of the glass tend to collect along the sides of the tank, and as the glass moves forward from the portion 3 to the portion 5 these impurities tend to follow the sides of the tank. These impurities working along the sides of the tank are naturally carried into the drawing tanks 6 nearest the heated portion 3 of the melting tank, and as a result the glass in these drawing tanks is of much poorer quality than that in the succeeding drawing tanks, such tanks acting as collectors for a large portion of the impurities formed in the entire tank. To overcome this difficulty and distribute the impurities among the various drawing tanks I have provided the inwardly projecting deflecting or baffle walls 12 and 13 which project into the glass in the melting tank a substantial distance and tend to deflect the glass flowing from the left hand end of the tank to the right hand thereof, toward the center of the tank. This movement inward carries the impurities away from the sides of the tank and into the center thereof, so that the tanks 6 are relieved of a large proportion of the impurities which would otherwise collect therein. I have found that this arrangement gives glass in the tank 6 of substantially the same quality as in the other tanks.

Another advantage incident to the use of the walls 12 and 13, is the evening up of the temperature of the glass in the various drawing tanks. The tanks 6 being nearest to the heated portion of the tank will ordinarily receive the hottest glass, and if the temperature of the glass in the succeeding tanks is at the proper point the glass in the tanks 6 is of undue fluidity. This is objectionable, as it is customary to draw the series of four cylinders on each side of the tank simultaneously; and the manipulation of the drawing apparatus is much easier where the speed of draw, controlled by a single operator, is the same for all of the cylinders. The provision of the walls 12 and 13 increases the distance which the hot glass has to traverse in reaching the drawing tanks 6, so that the temperature of the glass in these tanks is reduced and made more nearly the same as that in the succeeding tanks, thus providing for a uniform temperature in the various tanks and permitting the uniform draw heretofore referred to. Other advantages incident to the construction will be apparent to those skilled in the art.

What I claim is:

In combination, a glass melting tank, regenerator heating means at one end of the tank, a series of drawing tanks with open tops arranged along the sides of the other end of the tank and opening into the tank, and deflecting walls projecting inwardly into the tank from the opposite sides of the tank adjacent the drawing tanks nearest the said heating means and having their upper surfaces above the surface of the glass but spaced below the roof of the tank, whereby the glass flowing from the heated end of the tank is deflected away from openings into the said drawing tanks, said deflecting walls being relatively short as compared with the width of the tank, so that the major portion of the width of the tank at these walls is unobstructed.

In testimony whereof I have hereunto signed my name in the presence of the two subscribed witnesses.

HARRY G. SLINGLUFF.

Witnesses:
BAUNER M. ALLEN,
THOS. E. LAUGHER.